United States Patent
Bucher, II

(10) Patent No.: US 9,690,346 B1
(45) Date of Patent: Jun. 27, 2017

(54) LOAD SHARING ACROSS MULTIPLE VOLTAGE SUPPLIES

(71) Applicant: Seagate Technology LLC, Cupertino, CA (US)

(72) Inventor: James Douglas Bucher, II, Montgomery, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/928,806

(22) Filed: Oct. 30, 2015

(51) Int. Cl.
*G06F 1/26* (2006.01)

(52) U.S. Cl.
CPC .................... *G06F 1/266* (2013.01)

(58) Field of Classification Search
CPC ................ G06F 1/28; G06F 9/00; G05F 1/10
USPC ......................................... 713/300
See application file for complete search history.

(56) References Cited

U.S. PATENT DOCUMENTS

| | | | |
|---|---|---|---|
| 4,163,278 A | 7/1979 | Onoue et al. | |
| 6,313,616 B1 | 11/2001 | Deller et al. | |
| 7,154,725 B2 | 12/2006 | Chloupek et al. | |
| 7,332,832 B2 | 2/2008 | Rowan | |
| 8,654,551 B2 | 2/2014 | Sase et al. | |
| 8,924,641 B2 | 12/2014 | Trantham et al. | |
| 9,213,385 B2 * | 12/2015 | Berke | G06F 13/4221 |
| 2001/0003205 A1 * | 6/2001 | Gilbert | G06F 1/266 713/320 |
| 2005/0134239 A1 * | 6/2005 | Harris | H02J 1/10 323/210 |
| 2010/0185879 A1 | 7/2010 | Shaver | |
| 2011/0107124 A1 * | 5/2011 | Tupman | G06F 1/266 713/300 |
| 2012/0011376 A1 * | 1/2012 | Zai | G06F 1/263 713/300 |
| 2012/0223581 A1 * | 9/2012 | Conrad | A47L 9/2831 307/77 |
| 2013/0027121 A1 * | 1/2013 | Yoon | G11C 5/147 327/536 |
| 2013/0339757 A1 * | 12/2013 | Reddy | G06F 1/3212 713/300 |
| 2014/0108846 A1 * | 4/2014 | Berke | G06F 13/4221 713/340 |

FOREIGN PATENT DOCUMENTS

WO      0189070      11/2001

* cited by examiner

*Primary Examiner* — Vincent Tran
(74) *Attorney, Agent, or Firm* — Taylor English Duma LLP

(57) ABSTRACT

Methods and apparatuses for sharing power load across multiple input supplies in a peripheral device. Current utilized by the peripheral device from a first voltage supply is monitored and if the current exceeds a first threshold, a voltage converter is utilized to supplement the current from the first voltage supply with current from a second voltage supply up to a maximum total current threshold for the second voltage supply.

17 Claims, 5 Drawing Sheets

LOAD SHARING ACROSS MULTIPLE VOLTAGE SUPPLIES

BRIEF SUMMARY

The present disclosure relates to methods, systems, and apparatuses for sharing power load across multiple voltage supplies in a peripheral device. According to some embodiments, a method comprises monitoring current utilized by the peripheral device from a first voltage supply and if the current exceeds a first threshold, supplementing the current from the first voltage supply with current from a second voltage supply by converting the voltage of the second voltage supply to the voltage of the first voltage supply.

According to further embodiments, an apparatus for sharing power load across multiple voltage supplies includes a first current sense component configured to sense a current utilized by the peripheral device from a first voltage supply of the plurality of voltage supplies; a voltage converter configured to convert voltage of a second voltage supply of the plurality of voltage supplies to the voltage of the first voltage supply; and a current controller configured to monitor the current utilized by the peripheral device from the first voltage supply, and if the current utilized by the peripheral device from a first voltage supply exceeds a first threshold, drive the voltage converter to supplement the current from the first voltage supply with current from the second voltage supply.

According to further embodiments, a hard disk drive ("HDD") apparatus includes a power connector connecting the HDD apparatus to a host device and provides a plurality of voltage supplies from the host device to the HDD apparatus. A first set of components of the HDD apparatus are configured to draw power from a first voltage supply of the plurality of voltage supplies, and a second set of components are configured to draw power from a second voltage supply of the plurality of voltage supplies. A load sharing module is interposed between the plurality of voltage supplies and the first and second set of components and configured to monitor a current utilized by the first set of components from the first voltage supply, and if the current utilized by the first set of components from the first voltage supply is greater than a first threshold, supplement the current from the first voltage supply with current from the second voltage supply by converting the voltage of the second voltage supply to the voltage of the first voltage supply.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to methods, apparatuses, and systems for sharing power load across multiple voltage supplies in a peripheral device, such as a hard disk drive ("HDD") device. Advanced HDD devices, such as those used in enterprise storage systems, incorporate advanced technologies to increase storage density, data rates, reliability, and the like. These technologies may include multi-sensor magnetic recording ("MSMR"), two-dimensional magnetic recording ("TDMR"), solid-state hybrid drive ("SSHD") architectures, and the like. These technologies may incorporate multiple read sensors in the read/write heads, more complex encoding/decoding circuitry in the read/write channel, NAND-gate flash memories for caching/buffering, and other additional components and circuitry. In addition, HDD devices incorporating MSMR and/or TDMR may include multiple, parallel read/write channels and multiple system-on-chips "SOCs" implemented in the controller circuitry. All of these components require additional power for operation over a conventional HDD device.

Typically, a host server or storage array in which an enterprise HDD/SSHD device is installed may supply the required power for operation of the device internally. The host may supply the enterprise HDD device with multiple voltage sources in order to operate the various components of the device. For example, an enterprise HDD device may include a serial AT attachment ("SATA") power connector through which the host supplies +5V for operation of the read/write channel, host interface, memory and other circuitry and components of the controller, and +12V for the operation of the spindle motor, voice coil motor, microactuators on the read/write heads, and the like. The host may further supply +3.3V for the operation of NAND-gate flash memories and other digital logic, for example.

Further, each HDD device may be allotted a power budget that must be adhered to since the host server or storage array in which the device is installed may support tens or hundreds of such devices. This power budget may be further divided across the multiple voltage supplies. For example, a server system may allocate 9 W of power for each HDD device on a SATA hot-swap bus, with 6 W sub-allocated to the +5V supply and 3 W sub-allocated to the +12V supply. Because of the power requirements of the advanced circuitry included in enterprise HDD/SSHD devices, however, the power draw or current required from the +5V supply may exceed this allocation during operation of the device, while the +12V supply may only experience peak power/current usage at initial spin-up of the device.

Figure 1:
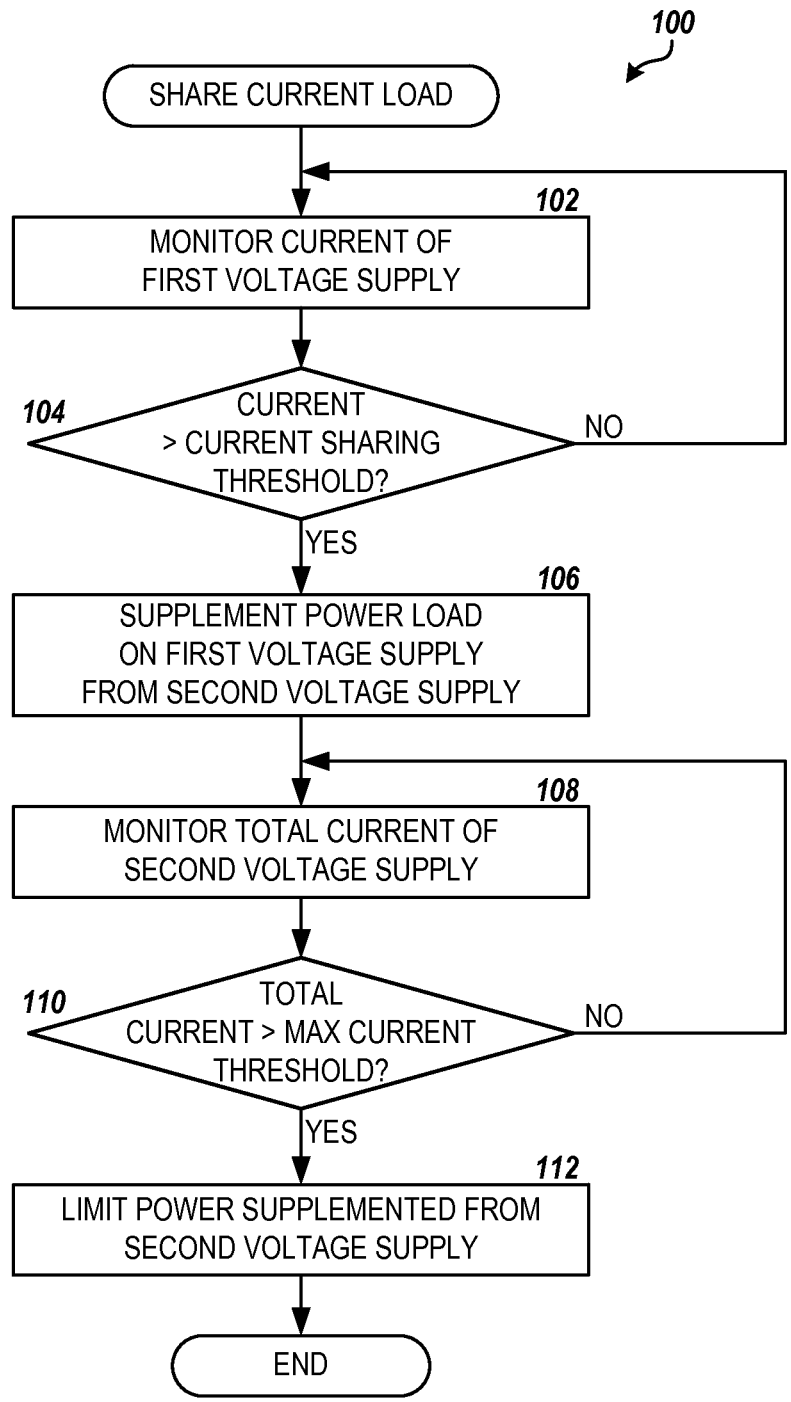
FIG. 1 is a flow diagram showing one method for sharing power load across multiple voltage supplies in a peripheral device, according to embodiments described herein.

Utilizing the embodiments described herein, an enterprise HDD/SSHD device or other peripheral device may be implemented in which the power load on one voltage supply may be supplemented from a second voltage supply when the current from the first supply exceeds a maximum threshold. For example, when the HDD device is performing read operations and/or track following, surplus power from the +12V supply may be utilized to supplement the +5V supply to keep the +5V power draw within allocated budgets. FIG. 1 illustrates one method of sharing power load across multiple voltage supplies in a peripheral device, such as an HDD device, according to some embodiments. The routine 100 may be performed during normal operation, or "user mode," of the device, for example. According to some embodiments, the routine 100 may be performed by a load sharing module or circuit implemented in the controller of the device.

The routine 100 includes step 102, where the current draw on the first voltage supply is monitored. For example, the load sharing module may monitor the current draw on the +5V supply from a SATA power connection of the HDD device. If the current draw on the first voltage supply exceeds a configured current sharing threshold, as shown at step 104, then the routine 100 proceeds to step 106, where the power provided on the first supply is supplemented from a second voltage supply. For example, if the current draw on the +5V supply exceeds 1.2 A, the load sharing module may supplement with current from the +12V supply. In some embodiments, this may be performed using a buck converter to convert the +12V supply to +5V, as will be shown in more detail below.

According to further embodiments, the load sharing module may further monitor the total current on the second voltage supply and limit the supplementation of the power load on the first voltage supply from the second voltage supply in order to keep the total current below a configured maximum current threshold. For example, the load sharing module may monitor the total current on the +12V supply to the HDD device, as shown at step 108. This may include the current load for +12V components of the device as well as the current being used to supplement the power load on the +5V supply. As shown at step 110, if the total current on the +12V supply exceeds the maximum current threshold, then the routine 100 proceeds to step 112, where the load sharing module limits the supplementation of power on the +5V supply from the +12V supply. If additional power beyond the limit is needed for the +5V components, it will be drawn from the +5V supply from the host.

Figure 2:
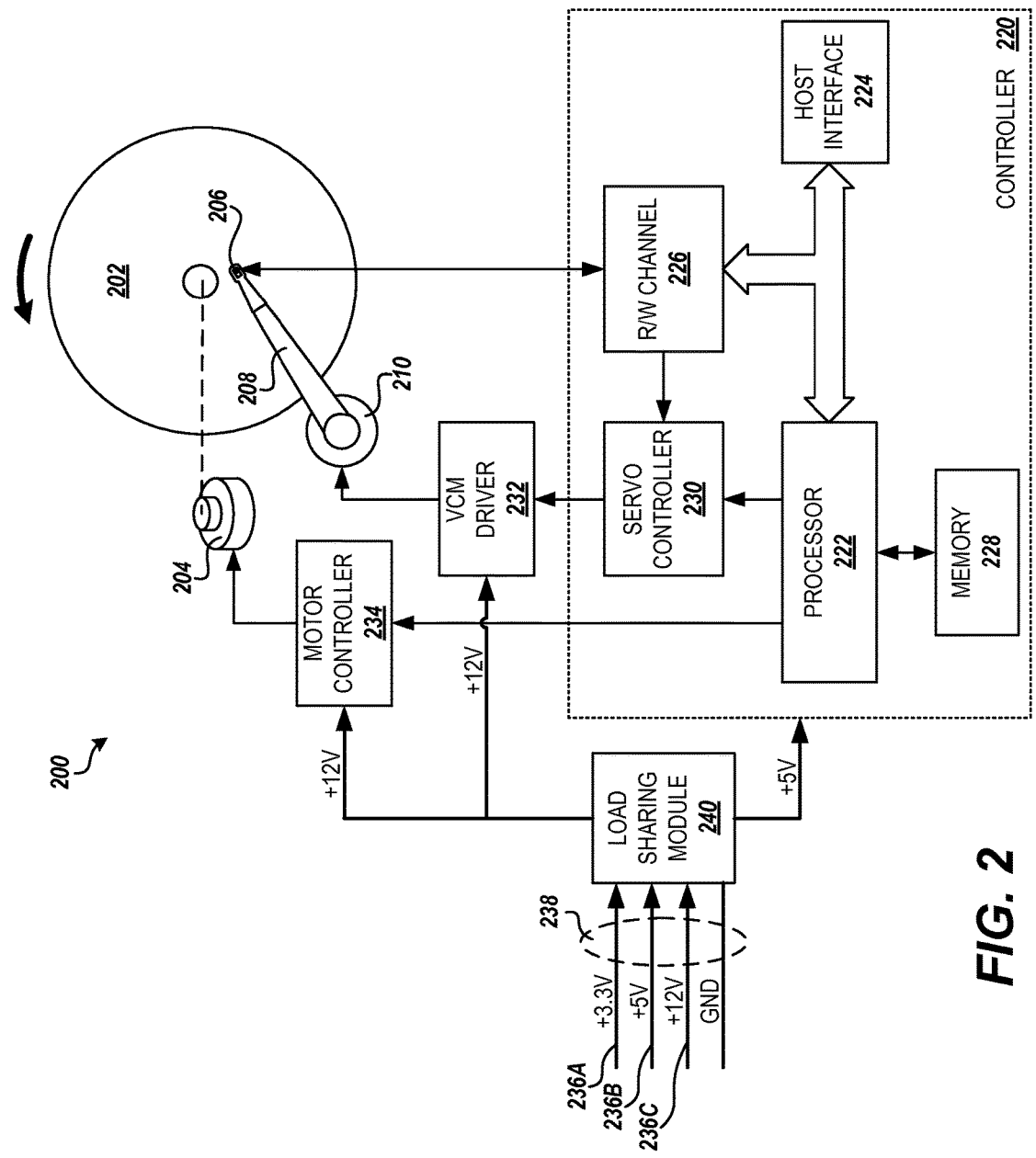
FIG. 2 is a block diagram showing an illustrative environment for load sharing, according to embodiments described herein.

FIG. 2 and the following description are intended to provide a general description of a suitable environment in which the embodiments described herein may be implemented. In particular, FIG. 2 shows an illustrative storage device 200, such as an enterprise HDD device, along with hardware, software and components for sharing power load across multiple voltage supplies in the device, according to the embodiments provided herein. The storage device 200 may include rotational storage media comprising at least one platter or disk 202 rotatable by a spindle motor 204, with each disk having at least one magnetic recording surface or coating.

The storage device 200 further includes at least one read/write head 206 located adjacent to each recording surface of the disks 202. The read/write heads 206 may read information from the disks 202 by sensing a magnetic field formed on portions of the recording surfaces, and may write information to the disks by magnetizing a portion of the surfaces. The read/write heads 206 may be located at the distal end of an arm 208, the arm being further connected to an actuator 210, such as a voice coil motor ("VCM"), that repositions the read/write heads 206. It will be appreciated by one of ordinary skill in the art that the each read/write head 206 may comprise multiple components, including one or more magneto-resistive ("MR") or tunneling MR reader elements, writer elements, micro-actuators, head heaters, sliders, and the like.

The storage device 200 may further comprise a controller 220 that controls the operations of the storage device. The controller 220 may include a processor 222 to monitor and control the operations of the storage device 200. The controller may further include a host interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The controller 220 may process write commands from the host device by formatting the associated data and transfer the formatted data via a read/write channel 226 through the read/write head 206 and to a target location on the recording surface of the disk 202. The controller 220 may further process read commands from the host device by determining the target location on the recording surface containing the desired data, moving the read/write head(s) 206 over the determined location, reading the data from the recording surface via the read/write channel 226, correcting any errors and formatting the data for transfer to the host device.

The read/write channel 226 may convert data between the digital signals received by the host interface 224 and/or processed by the processor 222 and the analog signals conducted through the read/write heads 206 for reading and writing data to the recording surface of the disks 202. The analog signals to and from the read/write heads 206 may be further processed through a pre-amplifier circuit (not shown). The read/write channel 226 may further provide servo data read from the disk 202 to the actuator 210 to position the read/write head 206. The read/write heads 206 may be positioned to read or write data to the target locations on the recording surface of the disks 202 by moving the read/write heads 206 radially across the disks using the actuator 210 while the spindle motor 204 rotates the disk to bring the target location under the read/write head. In some embodiments, the controller 220 may include multiple read/write channels 226 that operate in parallel for different read/write heads 206 associated with different recording surfaces at the same time.

The controller 220 may further include a computer-readable storage medium or "memory" 228 for storing processor-executable instructions, data structures and other information. The memory 228 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 228 may further comprise a portion of the storage media of the storage device 200, such as the maintenance cylinder ("M/C") of the disk 202. For example, the memory 228 may store a firmware that comprises commands and data necessary for performing the operations of the storage device 200. According to some embodiments, the memory 228 may store processor-executable instructions that, when executed by the processor, perform some or all of the steps 102-112 of the routine 100 for sharing power load across multiple voltage supplies in the storage device 200, as described herein.

In addition to the memory 228, the environment may include other computer-readable media storing program modules, data structures and other data described herein for sharing power load across multiple voltage supplies in the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The storage device 200 may be provided power for operation by the host device, such as a server computer, storage array, network-attached storage ("NAS") device, or the like. The power may be provided by the host device through a standard power connector 238, such as a SATA power connector, a Molex® power connector, a serial-attached SCSI ("SAS") connector, or the like. According to embodiments, the host may provide the storage device 200 with multiple voltage supplies, such as voltage supplies 236A-236C (referred to herein generally as voltage supplies 236), in order to operate various components of the device. For example, an enterprise HDD storage device 200 may utilize the +5V supply 236B provided at the SATA power connector 238 to operate the controller 220, including the processor 222, host interface 224, read/write channel(s) 226, memory 228, servo controller 230, and the like. The +12V supply 236C provided at the SATA power connector 238 may be utilized by the spindle motor 204, the actuator 210 (VCM), micro-actuators on the read/write heads, and the like. Other voltage supplies, such as the +3.3V supply 236A, may also be provided by the host and utilized by the storage device 200 for specific components.

In further embodiments, the storage device 200 may include a load sharing module 240. The load sharing module 240 may perform the methods and processes described herein for sharing power load across multiple voltage supplies in the storage device 200. According to some embodiments, the load sharing module 240 may be implemented in a hardware circuit implemented between the power connector 238 and the controller 220 and other components of the storage device 200. For example, the load sharing module may be implemented in an e-fuse circuit for the storage device 200. In further embodiments, the load sharing module 240 may be implemented in a combination of hardware and software in the controller 220. For example, the current sharing and maximum current thresholds may be stored in the memory 228 as part of the firmware of the storage device 200 and may be provided to the load sharing module circuitry by way of the processor 222.

It will be appreciated that the structure and/or functionality of the peripheral device may be different that that illustrated in FIG. 2 and described herein. For example, the processor 222, read/write channel(s) 226, memory 228, and other components and circuitry of the storage device 200 may be integrated within a common integrated circuit package, such as a system-on-a-chip ("SoS"), or they may be distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3:
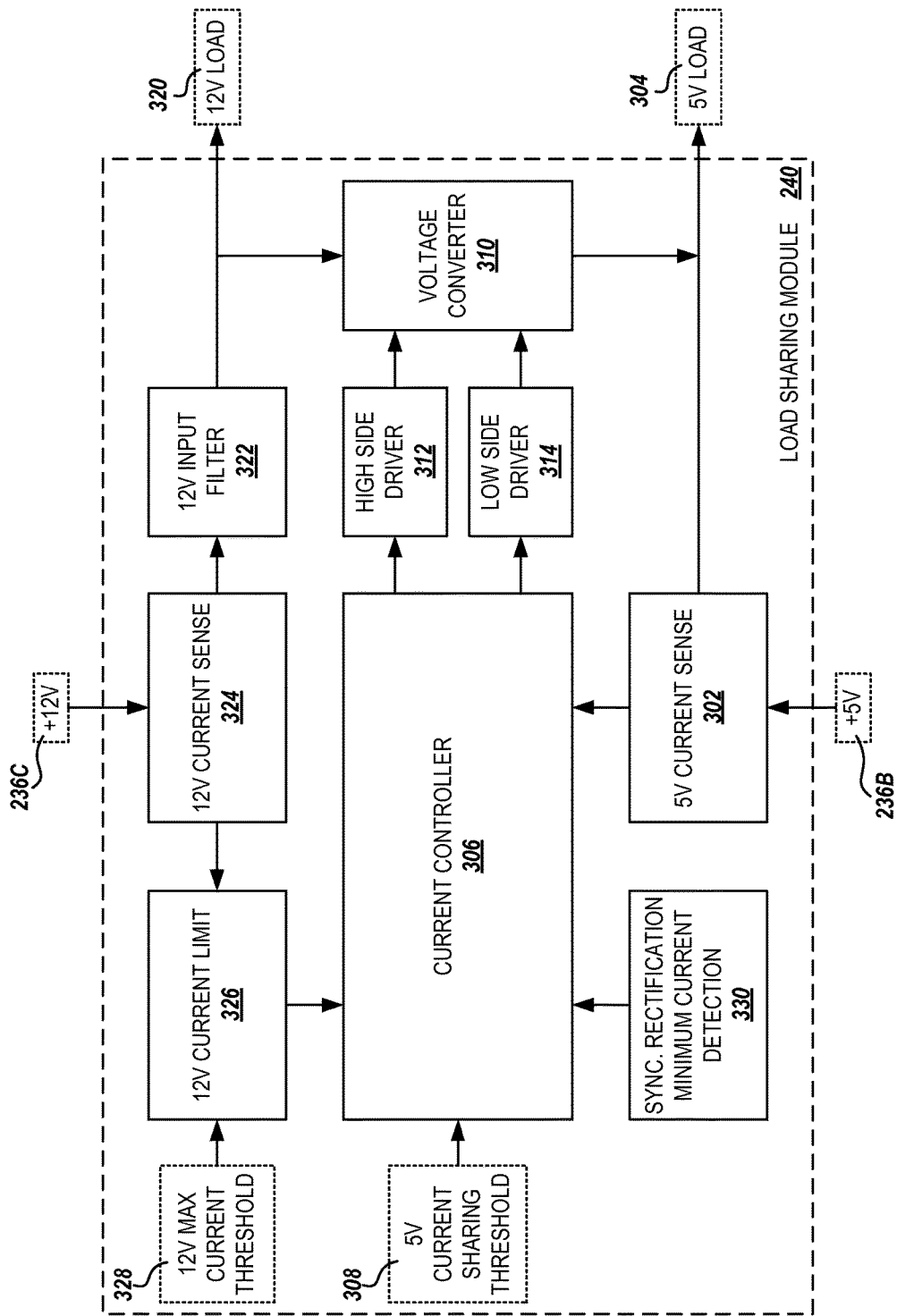
FIG. 3 is a block diagram showing one embodiment of a load sharing component, according to embodiments described herein.

FIG. 3 illustrates one implementation of the load sharing module 240 implemented in a peripheral device with at least two voltage supplies, a +5V supply 236B and a +12V supply 236C, such as the enterprise HDD/SSHD device described above with the SATA power connector, for example. The load sharing module 240 may include a 5V current sense component 302 that detects the current drawn from the +5V supply 236B by the 5V load 304 of the device. The 5V current sense component 302 is monitored by a current controller 306, and if the sensed current exceeds a configured 5V current sharing threshold 308, the current controller 306 drives a voltage converter 310 to supplement the power (current) available to the 5V load 304 from the +12V supply 236C. If the current draw subsequently falls below the 5V current sharing threshold 308, the current controller 306 may turn off the voltage converter 310 to stop supplementing the +5V supply 236B from the +12V supply 236C.

In some embodiments, the voltage converter 310 may comprise a switching regulator, such as a buck converter, driven by the current controller 306 through a high-side driver 312 and a low-side driver 314, as shown in FIG. 3. The load sharing module 240 may further include an input filter 322 between the +12V supply 236C and the voltage converter 310 to integrate the reflected buck converter switching current. In other embodiments, the voltage converter 310 may comprise a linear regulator or other type of voltage conversion circuitry or components.

According to further embodiments, the load sharing module 240 may include a 12V current sense component 324 to detect the total current drawn from the +12V supply 236C by the 12V load 320 of the device and the voltage converter 310. The 12V current sense component 324 may be monitored by a 12V current limiting component 326, and if the total current drawn from the +12V supply 236C exceeds a configured 12V maximum current threshold 328, the 12V current limiting component 326 causes the current controller 306 to regulate the voltage converter 310 to limit the amount of current drawn from the +12V supply 236C to supplement power on the +5V supply 236B so that the total current remains below the maximum current threshold. Any additional power required by the 5V load 304 will then be drawn from the +5V supply 236B. In further embodiments, the load sharing module 240 may include a synchronous rectification minimum current detection component 330 to control the current flow in the low-side switch of the buck converter and reduce conduction loss.

Figure 4:
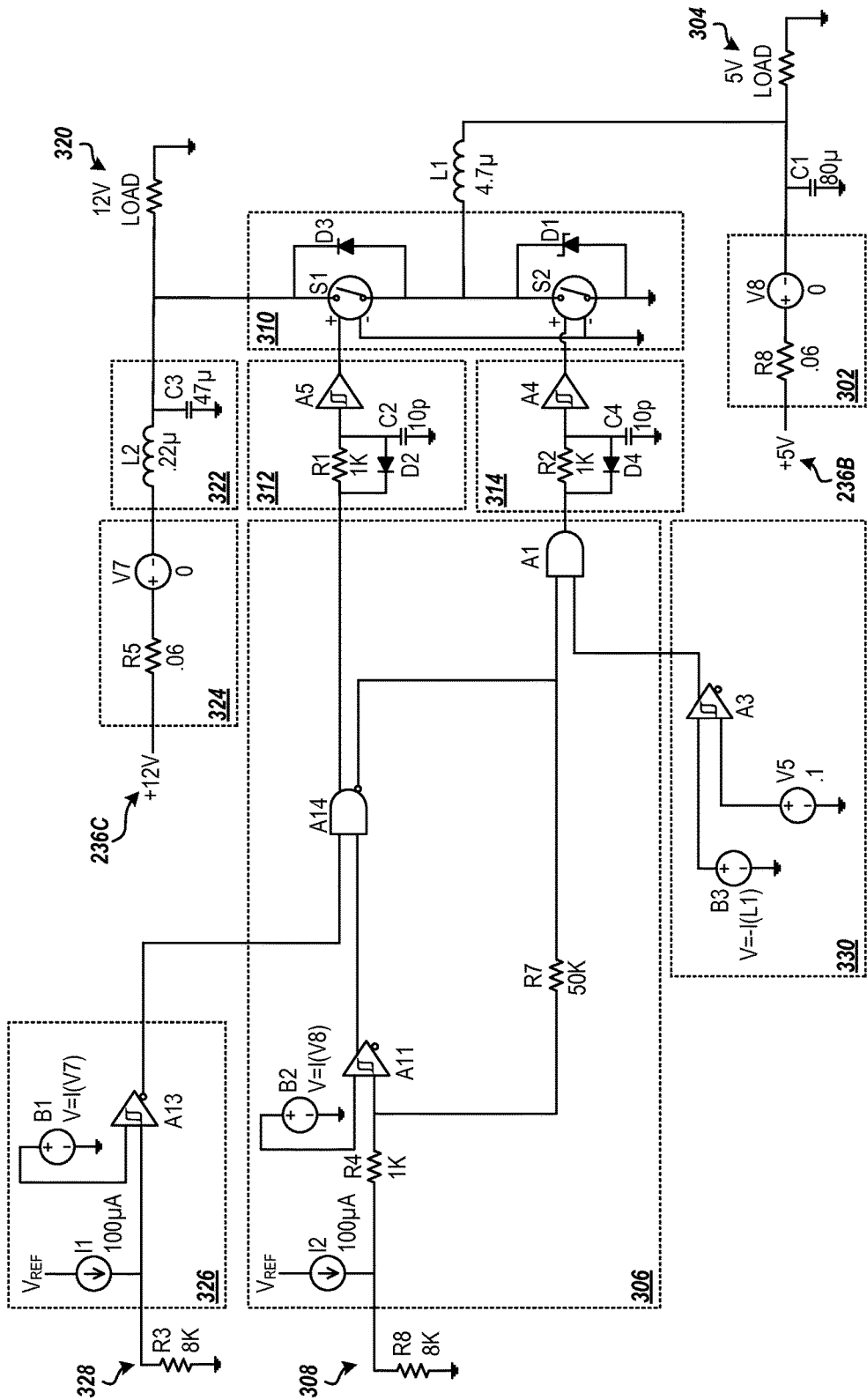
FIG. 4 is a circuit diagram showing one implementation of the load sharing component, according to embodiments described herein.

FIG. 4 is a circuit diagram showing of one implementation of the load sharing module 240 shown in FIG. 3. The implementation shown in the figure utilizes digital logic in the current controller 306 and the 12V current limiting component 326. The current controller 306 utilizes a variable frequency hysteretic current control circuit to drive a buck converter. The 5V current sharing threshold 308 and the 12V maximum current threshold are configured using specific values of the resistors R8 and R3, respectively. It will be appreciated that some components of the circuit diagram are shown using Simulation Program with Integrated Circuit Emphasis ("SPICE") circuit element symbology and could be implemented in a number of methods known in the art based on their function. For example, the 5V current sense component 302 and the 12V current sense component 324 may be implemented using inverting and/or non-inverting differential current sense circuits.

Figure 5:
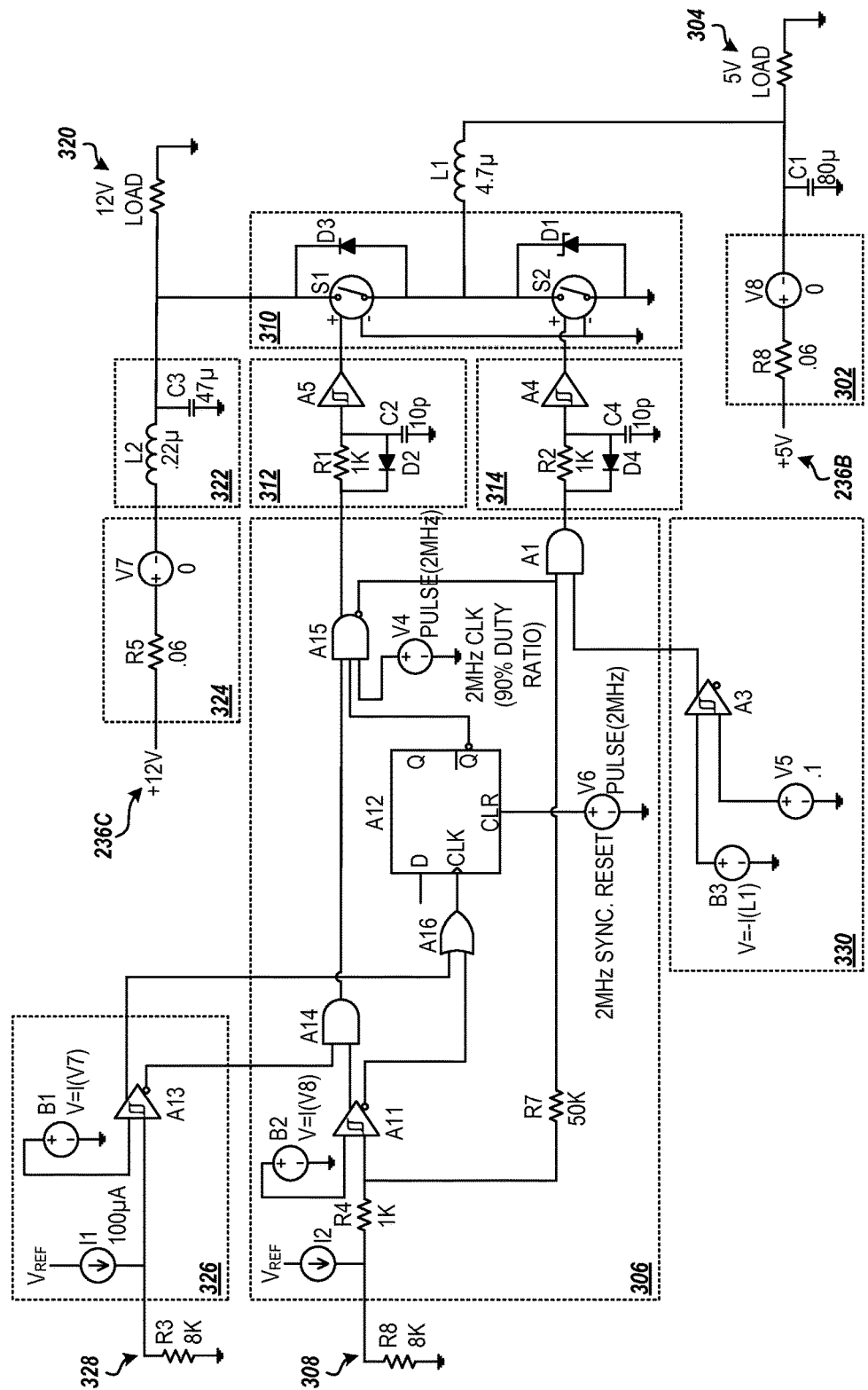
FIG. 5 is a circuit diagram showing another implementation of the load sharing component, according to embodiments described herein.

In the circuit diagram shown in FIG. 4, the converter frequency will vary with the load and input voltage. FIG. 5 is a circuit diagram showing of another implementation of the load sharing module 240 utilizing a fixed-frequency hysteretic current control circuit with a 2 MHz clock and latch to drive a buck converter with a 90% maximum duty cycle. The actual duty cycle of the converter will depend on the actual input voltages at the +5V supply 236B and +12V supply 236C. When the +5V and +12V supplies 236B and 236C are operating at 5 and 12 volts, respectively, the buck converter 310 will be driven at approximately 46%. However, sufficient overhead is built into the current controller 306 and voltage converter 310 to allow for operation from lower input voltages or for building current quickly during a load transient.

Based on the foregoing, it will be appreciated that methods and apparatuses for sharing power load across multiple voltage supplies in a peripheral device are presented herein. While the embodiments shown in FIGS. 3-5 provide for unidirectional provisioning of +12V power to the 5V output, it will be appreciated that a bi-directional load sharing circuit may be implemented in a similar fashion to allow the load sharing module 240 to also supplement +12V power from the +5V supply 236B. For example, a buck/boost topology may be implemented in the current controller 306 and the voltage converter 310 to provide bi-directional load sharing. In this embodiment, the load sharing module 240 may supplement +12V power from the +5V supply 236B to allow the HDD to spin up faster upon initialization, and then supplement the 5V power from the +12V to support advanced data processing logic and/or multiple read/write channels during data read/write operations.

In addition, various values of the 5V current sharing threshold 308 and the 12V maximum current threshold 328 may be configured beyond those described herein in order to satisfy various power budgets of host devices. In some embodiments, the 12V maximum current threshold 328 may not be set (the input pin may be left open) and thus no maximum current limit will be enforced as to +12V supply 236C. The embodiments provided herein may further be modified to handle other voltage levels of multiple voltage supplies 236, and more than the two voltage supplies 236 may be handled by the load sharing module 240. For example, the load sharing module 240 may further supplement power in the +3.3V supply 236A from the SATA power connector with power from the +12V supply 236C and/or the +5V supply 236B to power a large bank of NAND gate flash memory in an SSHD device. The above-described embodiments are merely possible examples of implementations, merely set forth for a clear understanding of the principles of the present disclosure.

It will be appreciated that the structure and/or organization of the components of the load sharing module 240 may be different from that illustrated in FIGS. 3-5 and described herein. For example, the current controller, voltage converter, 12V current limiting component, synchronous rectification minimum current detection, and other components and circuitry of the load sharing module 240 may be implemented in digital logic, analog circuits, or any combination thereof, and may be integrated within a common integrated circuit package or the components may be distributed among multiple integrated circuit packages. Similarly, the illustrated connection pathways are provided for purposes of illustration and not of limitation, and some components and/or interconnections may be omitted for purposes of clarity. It will be further appreciated that the load sharing module 240 may not include all of the components shown in the figures, or may include other components that are not explicitly shown in the figures.

The logical steps, functions, or operations described herein as part of a method, process or routine may be implemented (1) as interconnected digital circuits or components and/or (2) as a sequence of processor-implemented acts, software modules, or portions of code running on a controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method for sharing power load across a plurality of voltage supplies to a peripheral device, the method comprising steps of:
   monitoring a current utilized by the peripheral device from a first voltage supply of the plurality of voltage supplies;
   if the current utilized by the peripheral device from the first voltage supply is greater than a first threshold, supplementing the current from the first voltage supply with current from a second voltage supply of the plurality of voltage supplies by converting the voltage of the second voltage supply to the voltage of the first voltage supply;
   monitoring a total current utilized by the peripheral device from the second voltage supply; and
   if the total current utilized by the peripheral device from the second voltage supply is greater than a second threshold, limiting the supplementation of the current from the first voltage supply with the current from the second voltage supply.

2. The method of claim 1, wherein converting the voltage of the second voltage supply to the voltage of the first voltage supply is performed by a buck converter.

3. The method of claim 2, wherein the buck converter is driven by a variable-frequency hysteretic current control circuit.

4. The method of claim 2, wherein the buck converter is driven by a fixed-frequency hysteretic current control circuit.

5. The method of claim 1, wherein the peripheral device is a storage device with a Serial AT Attachment ("SATA") power connector and wherein the first voltage supply comprises a 5V power bus of the SATA power connector and the second voltage supply comprises a 12V power bus of the SATA power connector.

6. The method of claim 1, wherein the peripheral device is a hard disk drive ("HDD") device and the first voltage supply is utilized for a read/write channel of the HDD device and the second voltage supply is utilized for a spindle motor and voice coil motor of the HDD device.

7. The method of claim 1, wherein the steps are performed by a load sharing circuit embedded in an electronic fuse of the peripheral device.

8. An apparatus for sharing power load across a plurality of voltage supplies in a peripheral device, the apparatus comprising:
a first current sense component configured to sense a current utilized by the peripheral device from a first voltage supply of the plurality of voltage supplies;
a voltage converter configured to convert voltage of a second voltage supply of the plurality of voltage supplies to the voltage of the first voltage supply;
a current controller configured to monitor the current utilized by the peripheral device from the first voltage supply, and if the current utilized by the peripheral device from a first voltage supply exceeds a first threshold, drive the voltage converter to supplement the current from the first voltage supply with current from the second voltage supply;
a second current sense component configured to sense a total current utilized by the peripheral device from the second voltage supply; and
a current limiting component configured to monitor the total current total current utilized by the peripheral device from the second voltage supply, and if the total current utilized by the peripheral device from the second voltage supply exceeds a second threshold, cause the current controller to limit the supplementation of the current from the first voltage supply with the current from the second voltage supply.

9. The apparatus of claim 8, wherein the voltage converter comprises a buck converter.

10. The apparatus of claim 8, wherein the current controller comprises a hysteretic current control circuit.

11. The apparatus of claim 8, wherein the peripheral device is a storage device with a Serial AT Attachment ("SATA") power connector and wherein the first voltage supply comprises the SATA power connector 5V power bus and the second voltage supply comprises the SATA power connector 12V power bus.

12. The apparatus of claim 8, wherein the peripheral device is a hard disk drive ("HDD") device and the first voltage supply is utilized for a read/write channel of the HDD device and the second voltage supply is utilized for a spindle motor and voice coil motor of the HDD device.

13. The apparatus of claim 8, wherein the apparatus is embedded in an electronic fuse of the peripheral device.

14. A hard disk drive ("HDD") apparatus comprising:
a power connector connecting the HDD apparatus to a host device and providing a plurality of voltage supplies from the host device to the HDD apparatus;
a first set of components of the HDD apparatus configured to draw power from a first voltage supply of the plurality of voltage supplies;
a second set of components of the HDD apparatus configured to draw power from a second voltage supply of the plurality of voltage supplies; and
a load sharing module interposed between the plurality of voltage supplies and the first and second set of components, the load sharing module configured to
monitor a current utilized by the first set of components from the first voltage supply,
if the current utilized by the first set of components from the first voltage supply is greater than a first threshold, supplementing the current from the first voltage supply with current from the second voltage supply by converting the voltage of the second voltage supply to the voltage of the first voltage supply,
monitor a total current utilized by the first and second set of components from the second voltage supply, and
if the total current from the second voltage supply is greater than a second threshold, limit the supplementation of the current from the first voltage supply with the current from the second voltage supply.

15. The HDD apparatus of claim 14, wherein the load sharing module comprises a buck converter.

16. The HDD apparatus of claim 15, wherein the buck converter is driven by a hysteretic current control circuit.

17. The HDD apparatus of claim 14, wherein the first set of components comprises a read/write channel of the HDD apparatus and the second set of components comprises a spindle motor of the HDD apparatus.

* * * * *